United States Patent
Peters et al.

(10) Patent No.: US 10,744,435 B2
(45) Date of Patent: Aug. 18, 2020

(54) SPUNBOND POLYCARBONATE RESIN FILTER MEDIA

(71) Applicant: SABIC Global Technologies B.V., Bergen op Zoom (NL)

(72) Inventors: Richard Peters, Hinsdale, MA (US); François Guillaume Sébastien Courtecuisse, Bergen op Zoom (NL); Juha-Matti Levasalmi, Delmar, NY (US); Richard Lucas, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 634 days.

(21) Appl. No.: 15/329,322

(22) PCT Filed: Jul. 30, 2015

(86) PCT No.: PCT/IB2015/055788
§ 371 (c)(1),
(2) Date: Jan. 26, 2017

(87) PCT Pub. No.: WO2016/016848
PCT Pub. Date: Feb. 4, 2016

(65) Prior Publication Data
US 2017/0225104 A1   Aug. 10, 2017

Related U.S. Application Data

(60) Provisional application No. 62/030,849, filed on Jul. 30, 2014.

(51) Int. Cl.
*B01D 39/16* (2006.01)
*D01D 5/098* (2006.01)
(Continued)

(52) U.S. Cl.
CPC ....... *B01D 39/163* (2013.01); *B01D 39/1623* (2013.01); *D01D 4/025* (2013.01);
(Continued)

(58) Field of Classification Search
None
See application file for complete search history.

(56) References Cited

U.S. PATENT DOCUMENTS

| 3,276,944 | A | 10/1966 | Levy |
| 3,338,992 | A | 8/1967 | Kinney |

(Continued)

FOREIGN PATENT DOCUMENTS

| CN | 1141598 A | 1/1997 |
| CN | 1602372 A | 3/2005 |

(Continued)

OTHER PUBLICATIONS

J.A. Brydson; "Plastic Materials, Seventh Edition"; Butterworth-Heineman; 1999; ISBN: 978-0-7506-4132-6; p. 564.

(Continued)

*Primary Examiner* — Amber R Orlando
*Assistant Examiner* — Brit E. Anbacht
(74) *Attorney, Agent, or Firm* — Cantor Colburn LLP

(57) ABSTRACT

The invention concerns spunbond nonwoven fabrics comprising a plurality of bicomponent filaments, the bicomponent filaments having a segmented pie cross-sectional configuration including a polycarbonate component and a polypropylene component, wherein a ratio of the polypropylene component to the polycarbonate component is between about 5:95 and about 95:5.

19 Claims, 8 Drawing Sheets

(51) Int. Cl.
*D04H 3/011* (2012.01)
*D04H 3/016* (2012.01)
*D04H 3/018* (2012.01)
*D01F 8/06* (2006.01)
*D01F 8/14* (2006.01)
*D04H 3/11* (2012.01)
*D01F 8/16* (2006.01)
*D01D 4/02* (2006.01)

(52) U.S. Cl.
CPC ............ *D01D 5/0985* (2013.01); *D01F 8/06* (2013.01); *D01F 8/14* (2013.01); *D01F 8/16* (2013.01); *D04H 3/011* (2013.01); *D04H 3/016* (2013.01); *D04H 3/018* (2013.01); *D04H 3/11* (2013.01); *B01D 2239/0216* (2013.01); *B01D 2239/0225* (2013.01); *B01D 2239/0627* (2013.01); *B01D 2239/10* (2013.01); *D10B 2505/04* (2013.01)

(56) References Cited

U.S. PATENT DOCUMENTS

| | | | |
|---|---|---|---|
| 3,341,394 A | 9/1967 | Kinney | |
| 3,502,538 A | 3/1970 | Peterson | |
| 3,502,763 A | 3/1970 | Hartmann | |
| 3,542,615 A | 11/1970 | Dobo et al. | |
| 3,692,618 A | 9/1972 | Dorschner et al. | |
| 3,849,241 A | 11/1974 | Butin et al. | |
| 4,340,563 A | 7/1982 | Appel et al. | |
| 6,815,382 B1 | 11/2004 | Groten et al. | |
| 7,316,723 B2 | 1/2008 | Chung et al. | |
| 7,786,246 B2 | 8/2010 | Jansen et al. | |
| 2001/0042361 A1* | 11/2001 | Cox | B01D 39/1623 55/382 |
| 2002/0100494 A1* | 8/2002 | Brown | A47L 13/40 134/6 |
| 2002/0174869 A1* | 11/2002 | Gahan | B01D 39/163 128/206.12 |
| 2002/0187701 A1* | 12/2002 | Healey | B01D 39/1623 442/382 |
| 2004/0112213 A1* | 6/2004 | Dominiak | B01D 46/0036 95/90 |
| 2004/0192141 A1* | 9/2004 | Yang | B32B 5/02 442/342 |
| 2005/0138749 A1* | 6/2005 | Keck | A47L 13/16 15/231 |
| 2006/0242933 A1* | 11/2006 | Webb | B01D 39/1615 55/486 |
| 2007/0227359 A1* | 10/2007 | Choi | B01D 39/163 96/11 |
| 2008/0003430 A1* | 1/2008 | Wilson | D01D 4/02 428/375 |
| 2008/0311815 A1* | 12/2008 | Gupta | D01D 5/0985 442/351 |
| 2010/0222755 A1* | 9/2010 | Westwood | B32B 5/12 604/358 |
| 2011/0123775 A1* | 5/2011 | Westwood | D04H 1/74 428/172 |
| 2012/0116338 A1* | 5/2012 | Ferry | B32B 5/26 604/372 |
| 2014/0130469 A1* | 5/2014 | Nagy | B01D 39/18 55/487 |
| 2014/0357769 A1* | 12/2014 | Zheng | C08L 69/00 524/116 |
| 2014/0366732 A1* | 12/2014 | Gao | B01D 39/163 95/273 |
| 2015/0202560 A1* | 7/2015 | Jarrier | B01D 46/023 55/378 |
| 2016/0153493 A1* | 6/2016 | Henninger | F16C 33/201 384/42 |
| 2016/0264776 A1* | 9/2016 | Wolfe | C08J 5/046 |
| 2017/0062785 A1* | 3/2017 | Shi | H01M 2/1686 |
| 2017/0210835 A1* | 7/2017 | Shenoy | B01D 39/1623 |
| 2019/0000162 A1* | 1/2019 | Houde | A41D 13/11 |

FOREIGN PATENT DOCUMENTS

| | | |
|---|---|---|
| EP | 0814188 A1 | 12/1997 |
| JP | H10-053948 A | 2/1998 |
| JP | 2009084737 A | 4/2009 |
| WO | WO 1995/013856 A1 | 5/1995 |
| WO | 19980710 A1 | 1/1998 |
| WO | WO 1998/003710 A1 | 1/1998 |

OTHER PUBLICATIONS

Zweifel, "Plastics Additives Handbook, 5.sup.th Edition", (2001) Cincinnati: Hanser Gardner Publications, Inc., p. 540.

* cited by examiner

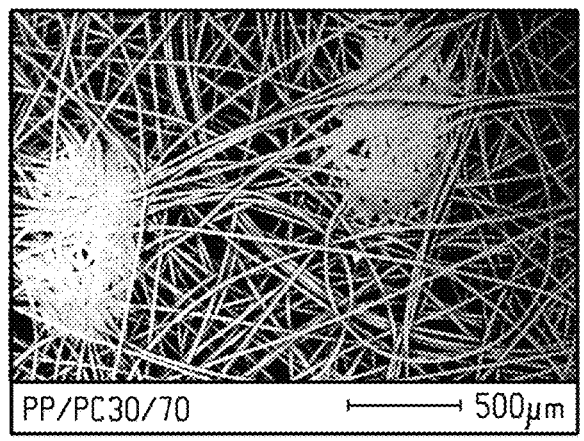
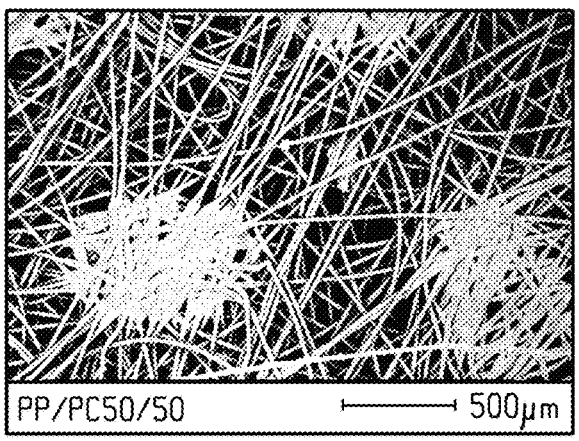
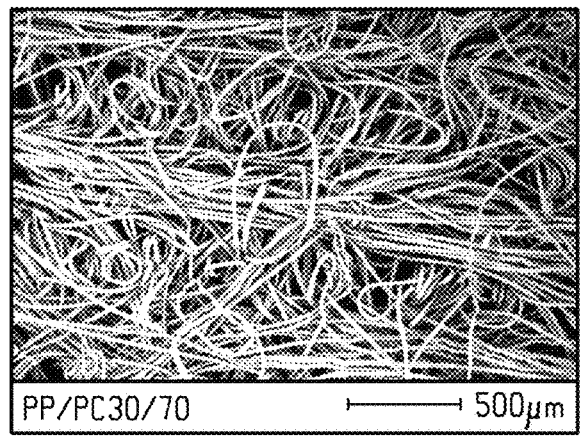
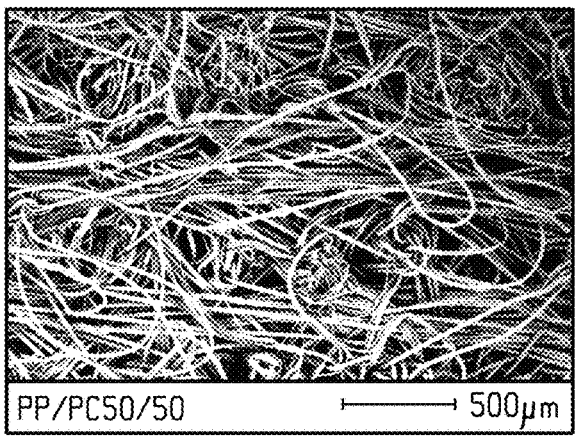
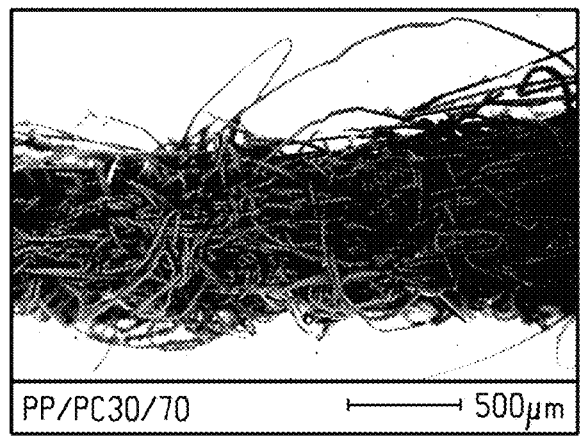
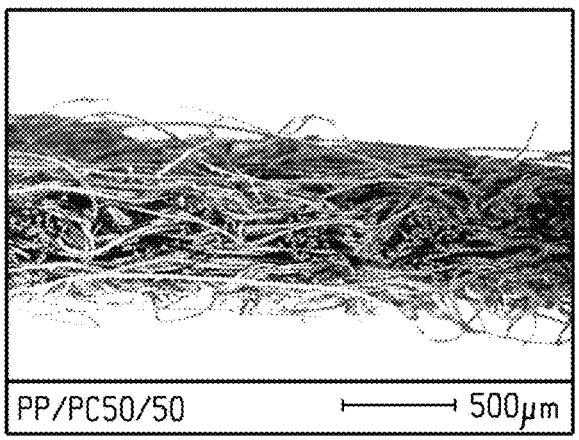
Fig. 2A　　　　　Fig. 2B

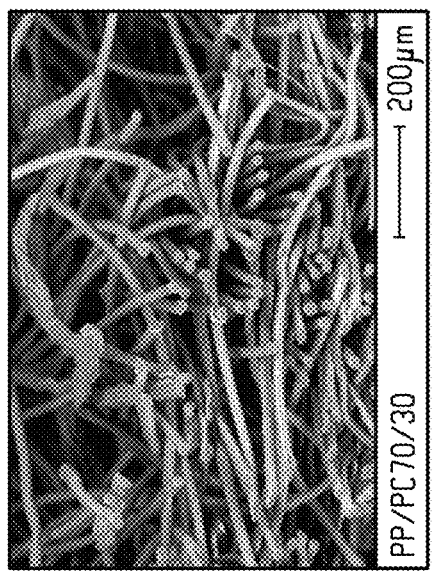
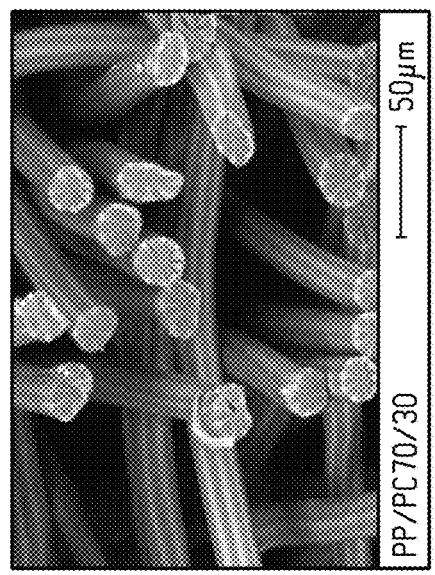
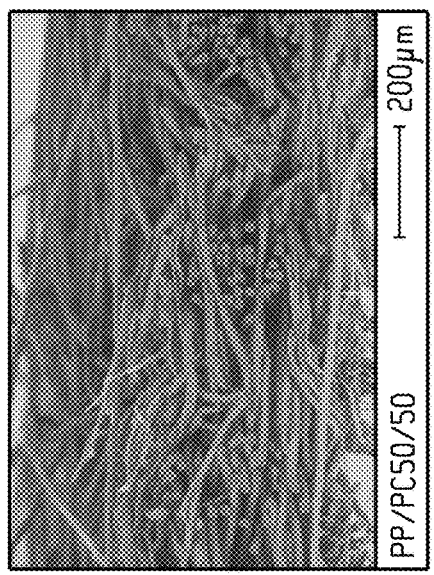
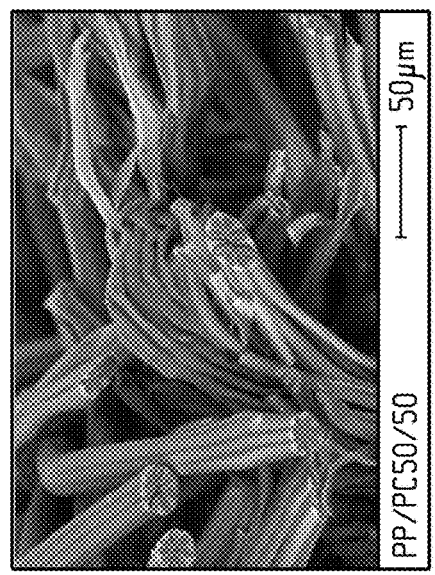
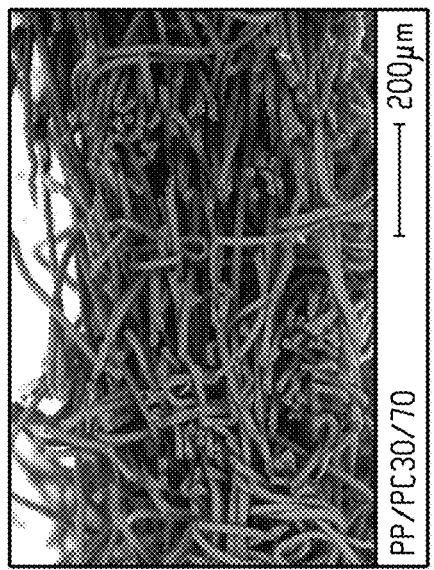
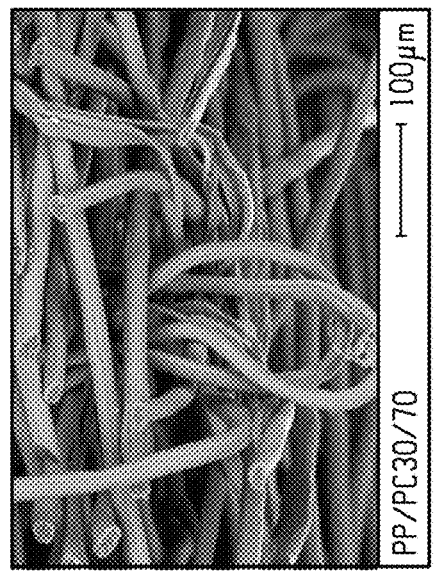
Fig. 3A  Fig. 3B  Fig. 3C (a)
510A/LUX2010T (b)
511A/LUX2010T (c)
510A/EXL1112T (d)
511A/EXL1112T

SPUNBOND POLYCARBONATE RESIN FILTER MEDIA

CROSS-REFERENCE TO RELATED APPLICATIONS

This application is the National Stage of International Application No. PCT/IB2015/055788, filed Jul. 30, 2015, which claims the benefit of U.S. Provisional Application No. 62/030,849, filed Jul. 30, 2014, the disclosures of which are incorporated herein by reference in their entireties.

TECHNICAL FIELD

This disclosure relates to spunbond polycarbonate resin filter media and the manufacture thereof.

BACKGROUND

Polycarbonates (PC) are useful in the manufacture of articles and components for a wide range of applications, from automotive parts to electronic appliances. PC use in spunbond and meltblown filtration media, however, has been limited due to the flow properties of PC not being suitable for production of fine fibers preferred in the production of filters.

There accordingly remains a need in the art for polycarbonate-based filtration constructs that avoid the limitations of the current state of the art.

SUMMARY

The above-described and other deficiencies of the art are met by spunbond nonwoven fabrics comprising a plurality of bicomponent filaments, the bicomponent filaments having a segmented pie cross-sectional configuration including a polycarbonate component and a polypropylene component, wherein a ratio of the polypropylene component to the polycarbonate component is between about 5:95 and about 95:5.

Another embodiment concerns filter media comprising a spunbond nonwoven described herein.

In yet another embodiment, spunbonded nonwoven fabrics are made using a method comprising: (i) separately melting a polycarbonate component and a polypropylene component; (ii) directing the polycarbonate component and the polypropylene component through spinneret orifices configured to form a plurality of bicomponent filaments; and (iii) causing at least a portion of the bicomponent filaments to break apart and entangle with each other.

The above described and other features are exemplified by the following drawings, detailed description, examples, and claims.

BRIEF DESCRIPTION OF THE DRAWINGS

The following is a brief description of the drawings wherein like elements are numbered alike and which are exemplary of the various embodiments described herein.

FIG. 2 shows SEM images of the nonwoven fabrics before hydro-entanglement (top) and after (middle and bottom). The PP:PC ratio within the fiber increases from left to right: (a) 30:70 and (b) 50:50.

FIG. 3 shows SEM images of the nonwoven fabrics after hydro-entanglement (middle and bottom). The PP:PC ratio within the fiber increases from left to right: (a) 30:70, (b) 50:50 and (c) 70:30.

DETAILED DESCRIPTION

Figure 1:
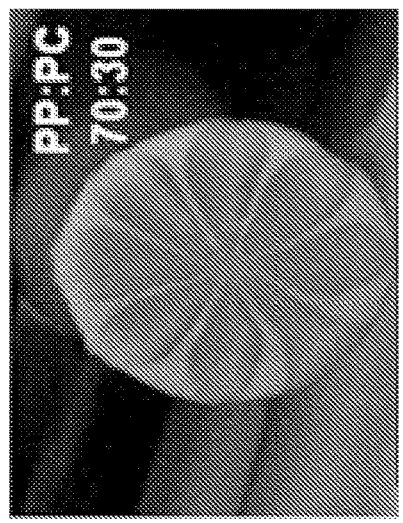
FIG. 1 shows the SEM images of the cross-section of bicomponent fibers made with the MR 2001 polypropylene (PP) with increasing PP:PC ratio. The two polymers are clearly noticeable. The PC appears lighter than the PP.
Figure 1:
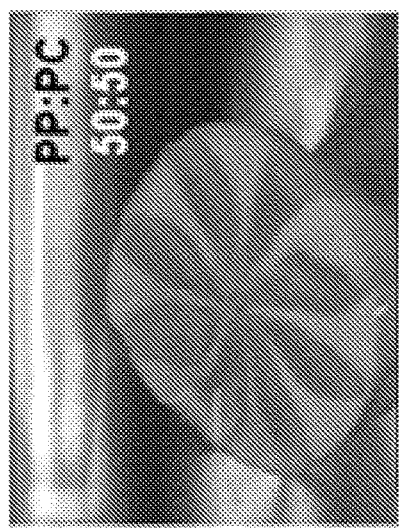
Figure 1:
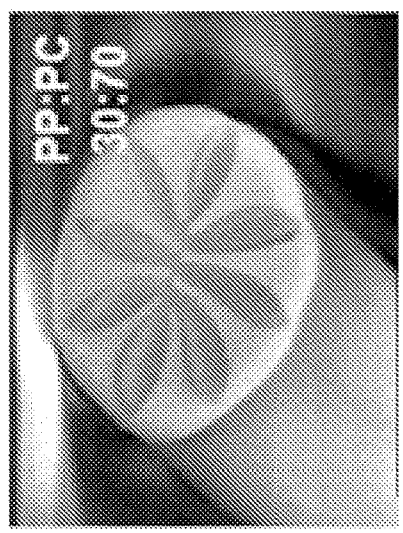

Typical filter media is made using both the spunbond and meltblown conversion processes with semicrystalline polyolefin materials. These materials are used because of their high fiber strength, high flow rate and low cost. We find that polycarbonate (PC) can used to boost the dust retention capability of standard filtration media because of its static properties. Fibers made of dielectric materials, such as PC, can develop a quasi-permanent electrical charge when subjected to electric field. Utilizing an appropriate grade PC can assist in developing the electrical charge. This charge can assist in capturing dust and other particles. The problem encountered in the art is that PC materials do not flow as well as polyolefins and therefore produce larger diameter fibers than the polyolefins. Reducing the diameters of PC fibers is difficult to do in standard nonwovens processing.

Air filtration media employing traditional PC resins and techniques, would need to be made in a 3 layer-structure, of a meltblown layer of PC fibers, with larger diameters, sandwiched between two spunbond layers of polyolefin materials. In such a construct, the PP spunbond layers provide mechanical integrity while the PC meltblown layer provides electret effect. In an aspect, polypropylene can be a preferred polyolefin.

The instant invention uses PC resins in the spunbond process, where the PC resins are coextruded with polyolefin materials. The fiber configuration can be the segmented pie geometry, or some other similar appropriate method of creating significantly finer fibers than standard processing. These instant methods enable high efficiency filtration media, while using much less material and energy to produce similar performing media. The PC fibers in this method will be in the few microns, about a micron or sub-micron range, therefore significantly higher surface area. In some embodiments, optimized grades of LEXAN™ polycarbonate resins are utilized. These resins are high performance with respect to charge retention. These considerations, along with the reduced materials in the overall media, provide a compelling improvement to existing technology.

The filter media of the invention can be used in a variety of filter applications including pulse cleaned and non-pulse cleaned filters for dust collection. Uses include, but are not limited to, filters gas or diesel engine air intake or induction systems, light vehicle engine intake or induction systems; Z filter; vehicle cabin air filters; off road vehicle cabin air filters, HVAC filters indoor air filters, and vacuum cleaner filters.

In some embodiments, the filters are particularly useful as cabin air filters (e.g., to filter air intake streams to the cabins of motorized vehicles). Cabin air filters are discussed in U.S. Pat. No. 7,316,723 which is incorporated herein by reference in its entirety.

Resins

The methods and articles of the instant disclosure utilize a combination of resins. Typically polycarbonate (PC) is used with a polyolefin. Any ratio of the two resins are contemplated within the invention. In some embodiments, the volume ratio of PC to polyolefin is about 5:95 to about 95:5. In other embodiments, the ratio of PC to polyolefin is about 25:75 to about 75:25 or about 30:70 to about 70:30. In some preferred embodiments, the polyolefin is polypropylene (PP).

Various grades of resins may be utilized. In some embodiments, for example, LEXAN™ PC homopolymer or LEXAN™ EXL PC-siloxane copolymer is utilized. LEXAN is a Bisphenol A polycarbonate that can range in weight average molecular weight from 18,000 to 40,000 grams per mole (g/mol) on an absolute PC molecular weight scale. LEXAN is SABIC IP B. V.'s registered trademark for a thermoplastic polycarbonate. In some embodiments, Ziegler-Natta or metallocene catalyzed polypropylene (PP) homopolymer or copolymer grades may be utilized. In some embodiments, Moplen HP561R (a polypropylene homopolymer from LyondellBasell), SABIC PP 510A (broad molecular weight distribution homopolymer), SABIC PP 511A (controlled rheology homopolymer with narrow molecular weight distribution), and Lumicene™ MR 2001 (a metallocene polypropylene homopolymer from Total Petrochemicals) were utilized. Example properties of PC and PP that can be used as part of this disclosure are shown in Tables 1-5.

TABLE 1

Typical properties of Lumicene ™MR 2001.

| Property | Method | Unit | Typical value |
|---|---|---|---|
| Melt flow index, 230° C., 2.16 kg | ISO 1133 | g/10 min | 25 |
| Flexural modulus | ISO 178 | MPa | 1300 |
| Melting point | ISO 3146 | ° C. | 151 |
| Density | ISO 1183 | g/cm$^3$ | 0.905 |
| Bulk density | ISO 1183 | g/cm$^3$ | 0.525 |
| Molecular weight distribution | | | narrow |

TABLE 2

Typical properties of Moplen HP561R.

| Property | Method | Unit | Typical value |
|---|---|---|---|
| Melt flow rate (MFR), 230° C., 2.16 kg | ISO 1133 | g/10 min | 25 |
| Melt volume flow rate, 230° C., 2.16 kg | ISO 1133 | cm$^3$/10 min | 34 |
| Tensile stress at break | ISO 527-1, -2 | N/mm$^2$ | 20 |
| Tensile stress at yield | ISO 527-1, -2 | N/mm$^2$ | 33 |
| Tensile strain at break | ISO 527-1, -2 | % | >500 |
| Tensile strain at yield | ISO 527-1, -2 | % | 11 |
| Flexural modulus | ISO 178 | MPa | 1300 |
| Charpy unnotched impact strength | ISO 179 | kJ/m$^2$ | 140 |
| Charpy notched impact strength | ISO 179 | kJ/m$^2$ | 4 |
| Heat deflection temperature B, 0.45 Mpa, unannealed | ISO 75B-1, -2 | ° C. | 86 |
| Vicat softening temperature, A50 | ISO 306 | ° C. | 153 |
| Vicat softening temperature, B50 | ISO 306 | ° C. | 93 |
| Molecular weight distribution | | | narrow |

TABLE 3

Typical properties of SABIC PP 510A and 511A.

| Property | Method | Unit | 510A | 511A |
|---|---|---|---|---|
| Melt flow rate (MFR), 230° C., 2.16 kg | ISO 1133 | g/10 min | 11 | 25 |
| Tensile stress at break | ISO 527-1, -2 | N/mm$^2$ | 43 | |
| Tensile stress at yield | ISO 527-1, -2 | N/mm$^2$ | 34 | 34 |
| Tensile strain at break | ISO 527-1, -2 | % | 600 | 11 |
| Flexural modulus | ISO 178 | MPa | 1800 | 1500 |
| Vicat softening temperature, A50 | ISO 306 | ° C. | 152 | |
| Vicat softening temperature, B50 | ISO 306 | ° C. | 92 | |
| Density | ISO 1183 | g/cm$^3$ | 0.905 | 0.905 |
| Molecular weight distribution | | | broad | narrow |

TABLE 4

Typical properties of LEXAN ™ OQ1028.

| Property | Method | Unit | Typical value |
|---|---|---|---|
| Melt volume rate, 250° C., 1.2 kg | ISO 1133 | cm$^3$/10 min | 9 |
| Tensile stress at yield, 50 mm/min | ISO 527 | MPa | 60 |

TABLE 4-continued

Typical properties of LEXAN™ OQ1028.

| Property | Method | Unit | Typical value |
| --- | --- | --- | --- |
| Tensile stress at break, 50 mm/min | ISO 527 | MPa | 45 |
| Tensile strain at yield, 50 mm/min | ISO 527 | % | 6 |
| Tensile strain at break, 50 mm/min | ISO 527 | % | >40 |
| Tensile modulus, 1 mm/min | ISO 527 | MPa | 2350 |
| Flexural stress, yield, 2 mm/min | ISO 178 | MPa | 90 |
| Flexural modulus, 2 mm/min | ISO 178 | MPa | 2300 |
| Izod impact, unnotched, 23° C. | ISO 180/1U | $kJ/m^2$ | NB |
| Izod impact, unnotched, −30° C. | ISO 180/1U | $kJ/m^2$ | NB |
| Izod impact, notched, 23° C. | ISO 180/1A | $kJ/m^2$ | 15 |
| Izod impact, notched, −30° C. | ISO 180/1A | $kJ/m^2$ | 12 |
| Vicat softening temperature, B50 | ISO 306 | ° C. | 138 |
| Vicat softening temperature, B120 | ISO 306 | ° C. | 140 |
| Heat deflection temperature, Bf, 0.45 MPa | ISO 75/Bf | ° C. | 132 |
| Heat deflection temperature, Af, 1.8 MPa | ISO 75/Af | ° C. | 122 |
| Density | ISO 1183 | $g/cm^3$ | 1.2 |

TABLE 5

Typical properties of LEXAN™ LUX2010T.

| Property | Method | Unit | Typical value |
| --- | --- | --- | --- |
| Melt volume rate, 250° C., 1.2 kg | ISO 1133 | $cm^3/10$ min | 6 |
| Melt Volume Rate, MVR at 300° C./1.2 kg | ISO 1133 | $cm^3/10$ min | 35 |
| Tensile stress at yield, 50 mm/min | ISO 527 | MPa | 61 |
| Tensile stress at break, 50 mm/min | ISO 527 | MPa | 64 |
| Tensile strain at yield, 50 mm/min | ISO 527 | % | 6 |
| Tensile strain at break, 50 mm/min | ISO 527 | % | 75 |
| Tensile modulus, 1 mm/min | ISO 527 | MPa | 2350 |
| Flexural stress, yield, 2 mm/min | ISO 178 | MPa | 90 |
| Flexural modulus, 2 mm/min | ISO 178 | MPa | 2300 |
| Izod impact, unnotched, 23° C. | ISO 180/1U | $kJ/m^2$ | NB |
| Izod impact, unnotched, −30° C. | ISO 180/1U | $kJ/m^2$ | NB |
| Izod impact, notched, 23° C. | ISO 180/1A | $kJ/m^2$ | 57 |
| Izod impact, notched, −30° C. | ISO 180/1A | $kJ/m^2$ | 14 |
| Vicat softening temperature, B50 | ISO 306 | ° C. | 144 |
| Vicat softening temperature, B120 | ISO 306 | ° C. | 145 |
| Heat deflection temperature, Bf, 0.45 MPa | ISO 75/Bf | ° C. | 133 |
| Heat deflection temperature, Af, 1.8 MPa | ISO 75/Af | ° C. | 122 |
| Density | ISO 1183 | $g/cm^3$ | 1.2 |

TABLE 6

Typical properties of LEXAN™ EXL1112T.

| Property | Method | Unit | Typical value |
| --- | --- | --- | --- |
| Melt volume rate, MVR at 300° C., 1.2 kg | ISO 1133 | $cm^3/10$ min | 19 |
| Tensile stress at yield, 50 mm/min | ISO 527 | MPa | 57 |
| Tensile stress at break, 50 mm/min | ISO 527 | MPa | 56 |
| Tensile strain at yield, 50 mm/min | ISO 527 | % | 5.4 |
| Tensile strain at break, 50 mm/min | ISO 527 | % | 119 |
| Tensile modulus, 1 mm/min | ISO 527 | MPa | 2340 |
| Flexural stress, yield, 2 mm/min | ISO 178 | MPa | 89 |
| Flexural modulus, 2 mm/min | ISO 178 | MPa | 2140 |
| Izod impact, unnotched, 23° C. | ISO 180/1U | $kJ/m^2$ | NB |
| Izod impact, unnotched, −30° C. | ISO 180/1U | $kJ/m^2$ | NB |
| Izod impact, notched, 23° C. | ISO 180/1A | $kJ/m^2$ | 65 |
| Izod impact, notched, −30° C. | ISO 180/1A | $kJ/m^2$ | 55 |
| Vicat softening temperature, B50 | ISO 306 | ° C. | 138 |
| Vicat softening temperature, B120 | ISO 306 | ° C. | 139 |
| Heat deflection temperature, Af, 1.8 MPa | ISO 75/Af | ° C. | 116 |
| Density | ISO 1183 | $g/cm^3$ | 1.2 |

TABLE 7

Typical properties of LEXAN™ EXL1434T.

| Property | Method | Unit | Typical value |
|---|---|---|---|
| Melt volume rate, MVR at 300° C., 1.2 kg | ISO 1133 | $cm^3/10$ min | 9 |
| Tensile stress at yield, 50 mm/min | ISO 527 | MPa | 56 |
| Tensile stress at break, 50 mm/min | ISO 527 | MPa | 55 |
| Tensile strain at yield, 50 mm/min | ISO 527 | % | 5.4 |
| Tensile strain at break, 50 mm/min | ISO 527 | % | 109 |
| Tensile modulus, 1 mm/min | ISO 527 | MPa | 2300 |
| Flexural stress, yield, 2 mm/min | ISO 178 | MPa | 88 |
| Flexural modulus, 2 mm/min | ISO 178 | MPa | 2120 |
| Izod impact, unnotched, 23° C. | ISO 180/1U | $kJ/m^2$ | NB |
| Izod impact, unnotched, −30° C. | ISO 180/1U | $kJ/m^2$ | NB |
| Izod impact, notched, 23° C. | ISO 180/1A | $kJ/m^2$ | 65 |
| Izod impact, notched, −30° C. | ISO 180/1A | $kJ/m^2$ | 55 |
| Vicat softening temperature, B50 | ISO 306 | ° C. | 138 |
| Vicat softening temperature, B120 | ISO 306 | ° C. | 139 |
| Heat deflection temperature, Af, 1.8 MPa | ISO 75/Af | ° C. | 116 |
| Density | ISO 1183 | $g/cm^3$ | 1.2 |

Polycarbonate Polymer

The terms "polycarbonate" or "polycarbonates" as used herein includes copolycarbonates, homopolycarbonates and (co)polyester carbonates.

The term polycarbonate can be further defined as compositions have repeating structural units of the formula (1):

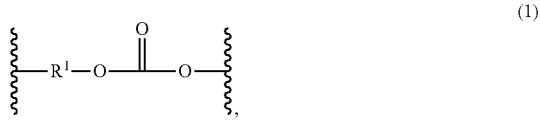

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

(2), wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of same.

Polypropylene

As used herein, the term "polypropylene" refers to a polymer comprising at least 95 weight percent, based on the weight of the polypropylene, of repeating units derived from propylene (i.e., —CH$_2$—CH(CH$_3$)— units). In some embodiments, the polypropylene comprises at least 98 weight percent, based on the weight of the polypropylene, of repeating units derived from propylene. When the polypropylene is a copolymer of propylene and another copolymerizable monomer, the other copolymerizable monomer can be, for example, ethylene, a $C_4$-$C_{12}$ alkene, a $C_1$-$C_6$-alkyl acrylate, a $C_1$-$C_6$-alkyl methacrylate, or a mixture of two or more of the foregoing monomers. In some embodiments, the polypropylene is a homopolymer of propylene. The polypropylene can be syndiotactic, isotactic, or atactic. In some embodiments, the polypropylene is atactic.

In some embodiments, the polypropylene has a weight average molecular weight of at least 15,000 g/mol. In some embodiments, the weight average molecular weight is 15,000 to about 1,000,000 g/mol, specifically about 20,000 to about 500,000 g/mol, more specifically about 30,000 to about 300,000 g/mol. In some embodiments, the polypropylene is a high molecular weight species that is distinguished from low molecular weight "polypropylene waxes", which have been disclosed as lubricants for thermoplastics but characterized as "lack[ing] a clearly defined application profile in the processing of plastics." H. Zweifel, ed., "Plastics Additives Handbook, 5$^{th}$ Edition", Cincinnati: Hanser Gardner Publications, Inc., page 540 (2001).

In some embodiments, preferably the polypropylene used in the invention, is a propylene homopolymer.

In some embodiments, the melt temperature Tm of the polypropylene as determined using differential scanning calorimetry (DSC) is from about 140 to 180° C., for example from about 150 to about 165° C., for example from about 155 to about 160° C. or the crystallization temperature (Tc) of the polypropylene as determined using DSC is from about 100° C. to about 120° C., for example from about 105 to about 115° C., for example from about 110 to about 115° C. The melt temperature Tm or the crystallization temperature Tc can be measured using Differential Scanning Calorimetry according to ASTM D 3418-08 using a scan rate of 10° C./min on a sample of 10 mg and using the second heating cycle.

In yet another embodiment, the melt temperature of the polypropylene is at least about 160° C. and for example at most about 200° C., for example at most about 180° C.

Polypropylene resin can be made by methods know to those skilled in the art. In addition, additives, such as those discussed above for PC resins, may be utilized with the polypropylene resins.

Additional Components

The thermoplastic composition can further include an impact modifier. Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

The additive composition can include an impact modifier, flow modifier, filler (e.g., a particulate polytetrafluoroethylene (PTFE), carbon, mineral, or metal), reinforcing agent, antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 weight percent (wt %), or 0.01 to 5 wt %, each based on the total weight of the polymer in the composition.

In addition to the polycarbonate, polypropylene (and any impact modifier), the thermoplastic composition can include various additives ordinarily incorporated into polymer compositions of this type, with the proviso that the additive(s) are selected so as to not significantly adversely affect the desired properties of the thermoplastic composition. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, e.g., a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the polycarbonate composition.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g, dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g, octyl-4,5-epoxy-hexahydrophthalate), tris-(octoxycarbonylethyl) isocyanurate, tristearin, di- or polyfunctional aromatic phosphates (e.g, resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g, alkyl stearyl esters, such as, methyl stearate, stearyl stearate, and the like), waxes (e.g, beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, silicate spheres, cenospheres, aluminosilicate or (armospheres), kaolin, whiskers of silicon carbide, alumina, boron carbide, iron, nickel, or copper, continuous and chopped carbon fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly (ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers are used in amounts of 1 to 200 parts by weight (pbw), based on 100 parts by weight of based on 100 parts by weight of the total composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Alternatively, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Fibers and Filter Media

The instant invention allows production of a single layer highly efficient filter media with remarkably high air flow via bicomponent PP:PC nonwoven spunbond technology. While the instant invention allows single layer filter media, the fabric and sheets of fibers produced by the inventive process can also be used with multilayer filter constructs.

Figure 8:
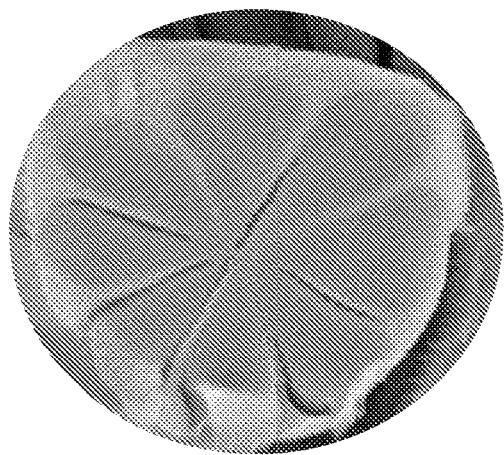
FIG. 8 shows the SEM images of the cross-section of bicomponent fibers made with various combinations of polymers.
Figure 8:
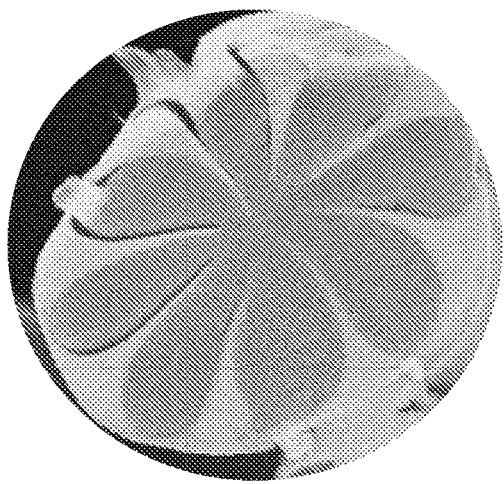
Figure 8:
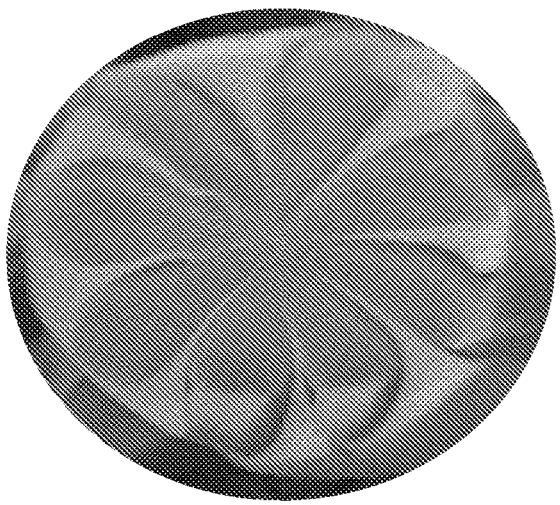
Figure 8:
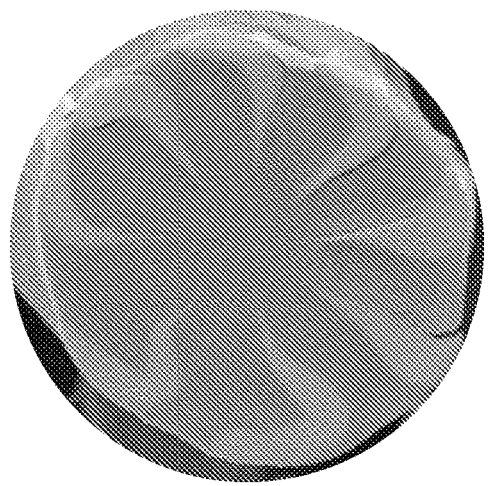

Micron and sub-micron fibers can be produced by methods known in the art. Such methods include spunbond and melt-blown methods. For example, a mixture of PC and polyolefin can be melt spun through spinneret orifices to produce bicomponent filaments. In some embodiments, the filaments have a segmented pie cross-sectional configuration. Examples of such a configuration are shown in FIG. 1 and FIG. 8.

The term "spunbond nonwoven fabric" refers to a fabric comprising a web of small diameter fibers and/or filaments. Small is a diameter of less than or equal to 50 micrometers. These filaments can be formed by extruding a molten thermoplastic material, or coextruding more than one molten thermoplastic material, as filaments from a plurality of fine (typically circular) capillaries in a spinneret. The diameter of the capillaries being selected in view of the desired fiber cross-sectional dimension (e.g., diameter). As filaments exit the capillaries, the diameter of the extruded filaments is typically rapidly reduced, for example, by non-eductive or eductive fluid-drawing or other well known spunbonding mechanisms. Illustrative examples of producing spunbonded nonwoven webs can be found in U.S. Pat. Nos. 4,340,563; 3,692,618; 3,338,992; 3,341,394; 3,276,944; 3,502,538; 3,502,763; and 3,542,615.

The term "meltblown nonwoven fabric" refers to a fabric comprising fibers formed by extruding a molten thermoplastic material through a plurality of fine (typically circular) die capillaries as molten threads or filaments into a high velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents including U.S. Pat. No. 3,849,241.

At least a portion of the bicomponent filaments can be caused to break apart and entangle with each other. While any suitable method may be utilized, water jetting is one method that splits fibers and provide mechanical integrity by entanglements. FIG. 3 demonstrates splitting of fibers and creation of entanglements by use of hydro-entanglement. It has been observed that hydro-entanglement increases by about 10 times the mechanical strength of the fabric.

The instant disclosure allows production of a low density (e.g., a density of less than or equal to 150 g/m$^2$) filter media comprising fibers of a few micrometers or sub-micrometer fibers. Such a filter media can comprise a single layer and provide high efficiency and a low pressure difference ($\Delta P$) through the filter media between the pressure measured at the beginning and at the end of the filter efficiency test (ISO 11057:2011 (E)). When used in a single layer filter, the technology allows for consumption of less raw material.

In addition to variation of the ratio of resins and grades of resins, the density of the fibers in the filter media can be varied. In some embodiments, densities can be 60-150 grams per square meter (g/m$^2$), for example 80-120 g/m$^2$. In some embodiments, the density can be 80, 100, or 120 g/m$^2$. It is understood that, in certain embodiments, ranges of densities can include any combination of the values described above.

It is observed that PP:PC ratio, fabric weight and the hydrojetting pressure have significant influence on the mechanicals. As fabric weight increased, filter efficiency increased, tensile strength increased and $\Delta P$ increased. As PP:PC ratio increased, $\Delta P$ increased and tensile strength decreased. Hydro-entanglement provides mechanical integrity to the fabric but increases $\Delta P$ and decreases tensile strength. As pressure/force of the water jet increased, tensile strength decreased. These features are demonstrated by the results presented in Table 10.

Definitions

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The singular forms "a," "an," and "the" include plural referents unless the context clearly dictates otherwise.

"Or" means "and/or."

The modifier "about" used in connection with a quantity is inclusive of the stated value and has the meaning dictated by the context (e.g., includes the degree of error associated with measurement of the particular quantity).

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants).

"Optional" or "optionally" means that the subsequently described event or circumstance can or can not occur, and that the description includes instances where the event occurs and instances where it does not.

A "combination" is inclusive of blends, mixtures, alloys, reaction products, and the like.

A value modified by a term or terms, such as "substantially," is intended to include the degree of error associated with measurement of the particular quantity based upon the equipment available at the time of filing this application. As an example, substantially similar nonwoven spunbond fabrics may comprise different polymers but may have the same sample size (within tolerance) and may be tested under comparable conditions using the same testing procedures to evaluate parameters such as charge retention.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

Unless specified otherwise, all test standards disclosed herein (e.g., ISO standards), are the most recent standard available as of Jul. 30, 2014.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

EXAMPLES

The following examples are intended to be illustrative and not limiting.

The following components are used in the examples. Unless specifically indicated otherwise, the amount of each component is in weight percent in the following examples, based on the total weight of the composition.

Four polypropylene resin grades were used in this study, Moplen HP561R homopolymer from LyondellBasell, PP 510A and PP 511A from SABIC, and a metallocene homopolymer polypropylene Lumicene™ MR 2001 from TOTAL Petrochemicals. The polycarbonate resin used in combination with the polypropylene to produce bicomponent fibers were LEXAN™ OQ1028, LUX2010T, EXL1112T, and EXL1434T. The polycarbonate resins were dried for a minimum of 4 h at 120° C. prior to processing.

Spunbond Process

All nonwovens fabrics described in this example were produced on a Reicofil™ 4 bicomponent spunbond line. The spinneret configuration was segmented-pie (s/p). The fiber component introduced in the extruder C1 was polypropylene resin and the component in the extruder C2 was the polycarbonate resin. As seen in Table 8, the total throughput of the line was 280 kilograms per hour (kg·h$^{-1}$). The line speed varied from 33 to 50 meters per minute (m·min$^{-1}$) in order to obtain 3 different fabric weights, 120, 100 and 80 grams per square meter g·m$^{-2}$ (gsm). Three PP:PC ratios within the fibers was considered through the spin pumps of C1 and C2: 70:30, 50:50 and 30:70. The extrusion temperature of C1 was set to 260° C. and 300° C. for C2. Both die temperatures were set at 310° C.

TABLE 8

Throughput processing parameters.

| Sample number | Sample project number | Line speed (m · min$^{-1}$) | Fabric weight (gsm) | Throughput ratio C1:C2, (Polymer ratio PP:PC) |
|---|---|---|---|---|
| 194 | 1 | 33 | 120 | 70:30 |
| 195 | 2 | 40 | 100 | 70:30 |
| 196 | 3 | 50 | 80 | 70:30 |
| 197 | 4 | 33 | 120 | 50:50 |
| 198 | 5 | 40 | 100 | 50:50 |
| 199 | 6 | 50 | 80 | 50:50 |
| 200 | 7 | 33 | 120 | 30:70 |
| 201 | 8 | 40 | 100 | 30:70 |
| 202 | 9 | 50 | 80 | 30:70 |
| 203 | 10 | 33 | 120 | 70:30 |
| 204 | 11 | 40 | 100 | 70:30 |
| 205 | 12 | 50 | 80 | 70:30 |
| 206 | 13 | 33 | 120 | 50:50 |
| 207 | 14 | 40 | 100 | 50:50 |
| 208 | 15 | 50 | 80 | 50:50 |
| 209 | 16 | 33 | 120 | 30:70 |
| 210 | 17 | 40 | 100 | 30:70 |
| 211 | 18 | 50 | 80 | 30:70 |

Hydro-Entanglement

The fabric webs were consolidated via hydro-entanglement, not in line of the spunbond process but offline. Nine of the eighteen samples were considered for this operation. Samples can be seen in Table 9. The highest and lowest PP:PC ratios and fabric weights were chosen for the two polypropylene types. An additional point corresponding to the metallocene polypropylene was added to the design (sample 208).

TABLE 9

Samples selected for hydro-entanglement.

| PP type | Sample number | Polymer ratio (PP:PC) | Fabric weight, measured (gsm) |
|---|---|---|---|
| HP 561R | 194 | 70:30 | 120.2 |
| HP 561R | 196 | 70:30 | 78.9 |
| HP 561R | 200 | 30:70 | 114.7 |
| HP 561R | 202 | 30:70 | 75.5 |
| MR 2001 | 203 | 70:30 | 119.5 |
| MR 2001 | 205 | 70:30 | 79.5 |
| MR 2001 | 208 | 50:50 | 78.1 |
| MR 2001 | 209 | 30:70 | 116.3 |
| MR 2001 | 211 | 30:70 | 74.5 |

The speed of the belt was either 10 or 15 m·min$^{-1}$. The sieves of drum 1 and 2 were respectively 89 and 100 mesh. Three pressure beams were applied on the fabrics at various pressures depending on the mechanical strength of the nonwovens and the inherent upper limit of the process. Pressure beam are listed below in Table 10. The type of stripes created by the pressure was 0.15, 0.10, and 0.10 mm by respectively beam 1, 2 and 3.

TABLE 10

Hydro-entanglement processing parameters.

| Sample number | Sample project number | Polymer ratio (PP:PC) | Line speed (m · min⁻¹) | Pressure beam 1 (bar) | Pressure beam 2 (bar) | Pressure beam 3 (bar) |
|---|---|---|---|---|---|---|
| 194 | 1 | 70:30 | 10 | 60 | 100 | 150 |
|  | 1a | 70:30 | 10 | 60 | 135 | 185 |
| 196 | 3 | 70:30 | 10 | 60 | 100 | 150 |
|  | 3a | 70:30 | 10 | 60 | 135 | 185 |
| 200 | 7 | 30:70 | 10 | 40 | 60 | 80 |
|  | 7a | 30:70 | 15 | 40 | 60 | 80 |
| 202 | 9 | 30:70 | 15 | 40 | 60 | 80 |
|  | 9a | 30:70 | 15 | 60 | 80 | 100 |
|  | 9b | 30:70 | 15 | 60 | 100 | 120 |
|  | 9c | 30:70 | 15 | 60 | 100 | 150 |
|  | 9d | 30:70 | 15 | 60 | 135 | 185 |
| 203 | 10 | 70:30 | 10 | 60 | 100 | 150 |
|  | 10a | 70:30 | 10 | 60 | 135 | 185 |
| 205 | 12 | 70:30 | 10 | 60 | 100 | 150 |
|  | 12a | 70:30 | 10 | 60 | 135 | 185 |
| 208 | 15 | 50:50 | 10 | 60 | 100 | 150 |
|  | 15a | 50:50 | 10 | 60 | 135 | 185 |
| 209 | 16 | 30:70 | 15 | 40 | 60 | 80 |
| 211 | 18 | 30:70 | 15 | 40 | 60 | 80 |
|  | 18a | 30:70 | 15 | 60 | 80 | 100 |
|  | 18b | 30:70 | 15 | 60 | 100 | 120 |
|  | 18c | 30:70 | 15 | 60 | 100 | 150 |
|  | 18d | 30:70 | 15 | 60 | 135 | 185 |

Fabric Characterization

Scanning electron microscopy (SEM) images were acquired on a XL30 Environmental SEM from FEI in a back scattered mode using a LaB$_6$ source with a spot size of 4 μm (micrometers) and an accelerating voltage of 15 kV (kilovolt). Tensile tests were performed according to ISO-9073-3, "Textiles—Test methods for nonwovens, Part 3: Determination of tensile strength and elongation." The applied test speed was 100 millimeters per minute (mm·min⁻¹), the gauge length 100 mm and the clamping force of 1 kN (kiloNewton). Filter efficiency was tested according to the phase 1 (conditioning) of the standard ISO 11057:2011 (E), "Air quality—Test method for filtration, characterization of cleanable filter media". Only 1 loading cycles with differential pressure controlled was performed.

Results and Discussion

The bicomponent spunbond trial started using Moplen HP561R polypropylene with a PP:PC ratio of 70:30 within the segmented-pie cross-section fiber and with a fabric weight set to 120 gsm which was then set to 100 and 80 gsm. After that, the PP:PC ratio was varied to 50:50 and fabrics were produced again at 120, 100 and 80 gsm and likewise at a PP:PC ratio of 30:70. Then, the design was re-run with the metallocene polypropylene Lumicene™ MR 2001.

As the hydro-entanglement was not available online, thermal bonding was initially used to provide mechanical integrity to the fabrics. The bonding is clearly observed under SEM as seen in the top part of FIG. 2. As mentioned previously, nine of the eighteen initial samples were selected for hydro-entanglement: the highest and lowest PP:PC ratios and fabric weights for the two polypropylene types with an additional point corresponding to the polypropylene was added to the design (see Table 3). As seen in FIG. 2, entanglements are clearly visible on the fabric.

Under higher magnification, SEM images of FIG. 3 reveal the splitting of the bicomponent fibers after this step. Here the highest water pressure beam was applied. No splitting is observed for the lowest PP:PC ratio as could be expected due to the core-sheath/flower cross-section of the fiber which may prevent fiber delamination. However, even with increasing PP:PC ratio, when fibers do not exhibit the core-sheath morphology, little splitting is noticed for the 50:50 ratio and very little for the 70:30 ratio. Similar splitting behavior has been observed on samples made of the Moplen HP561R polypropylene and for the different fabric weights.

As an illustrative example, the materials in bicomponent spunbond process encounter different thermal histories. Both bicomponent materials were extruded at their normal processing temperatures, (e.g., PP at 260°-300° C. and PC resins 280°-310° C. depending on their viscosity). In the spinneret, at 285°-300° C., the polymer streams are split in the segmented pie configuration at the exit of the spinneret. The viscosity of the different streams is dependent on the temperature of the spinneret. As shown, the spinneret temperature is about 300° C. and the PP tends to encapsulate the PC to form a "flower" or segmented pie configuration with a solid center and broad petals, as illustrated in FIG. 8 (e.g., FIG. 8d). The viscosity difference between PP and the PC for the 511A and EXL112T is the largest, therefore broad petals are formed with a solid center. In case of LUX2010T the viscosity difference is much smaller and therefore the "flower" has a small solid center and the petals have a droplet shape (e.g., FIG. 8b). The PP 510A has even a smaller viscosity difference with the PC resin and it creates a "flower" or segmented pie shape with no solid center of PP. The petals are not connected with each other in the center (e.g., FIG. 8a). After the polymer streams come together the segmented filaments are cooled down and stretched with air. As temperature decreases the PC solidifies first, freezing off the "flower" morphology Mechanical Properties Mechanical properties of fabric hydro-entangled are listed below in Table 11. They were measured in machine (MD) and cross (CD) directions. The third column shows the PP fraction within the bicomponent PP:PC fiber, the pressure in the fifth column is the sum of the three beam pressures applied to the fabric and divided by the belt speed.

TABLE 11

Tensile properties measured on the fabrics in machine and cross directions.

| Sample number | Sample project number | PP fraction | Fabric weigh measured (gsm) | Pressure (Bar · min · m) | Max. tensile strength MD (N) | Max. tensile strength CD (N) | Elongation MD (%) | Elongation CD (%) |
|---|---|---|---|---|---|---|---|---|
| 194 | 1 | 0.7 | 120.2 | 31.0 | 17.2 | 23.2 | 16.8 | 46.8 |
|  | 1a | 0.7 | 119.1 | 38.0 | 58.0 | 31.6 | 34.3 | 42.8 |
| 196 | 3 | 0.7 | 78.9 | 31.0 | 19.9 | 16.7 | 25.4 | 55.2 |
|  | 3a | 0.7 | 77.9 | 38.0 | 29.5 | 22.6 | 30.0 | 52.4 |
| 200 | 7 | 0.3 | 114.7 | 18.0 | 90.0 | 92.4 | 30.7 | 62.1 |
|  | 7a | 0.3 | 114.7 | 12.0 | 41.9 | 81.6 | 17.8 | 61.8 |
| 202 | 9 | 0.3 | 75.5 | 12.0 | 61.9 | 38.1 | 35.8 | 52.0 |
|  | 9a | 0.3 | 74.9 | 16.0 | 80.4 | 46.8 | 41.1 | 56.9 |
|  | 9b | 0.3 | 76.2 | 18.7 | 83.4 | 51.1 | 39.6 | 59.2 |

TABLE 11-continued

Tensile properties measured on the fabrics in machine and cross directions.

| Sample number | Sample project number | PP fraction | Fabric weigh measured (gsm) | Pressure (Bar · min · m) | Max. tensile strength MD (N) | Max. tensile strength CD (N) | Elongation MD (%) | Elongation CD (%) |
|---|---|---|---|---|---|---|---|---|
| | 9c | 0.3 | 75.9 | 20.7 | 89.4 | 54.8 | 41 | 60.2 |
| | 9d | 0.3 | 76.1 | 25.4 | 93.0 | 55.4 | 39.2 | 58.4 |
| 203 | 10 | 0.7 | 119.5 | 31.0 | 45.4 | 40.0 | 27.1 | 48.4 |
| | 10 | 0.7 | 121.3 | 38.0 | 72.0 | 52.0 | 32.2 | 46.4 |
| 205 | 12 | 0.7 | 79.5 | 31.0 | 28.2 | 24.4 | 27.6 | 56.0 |
| | 12a | 0.7 | 79.5 | 38.0 | 46.7 | 31.7 | 31.6 | 51.4 |
| 208 | 15 | 0.5 | 78.1 | 31.0 | 53.0 | 33.1 | 27.0 | 42.1 |
| | 15a | 0.5 | 78.3 | 38.0 | 65.5 | 39.9 | 26.9 | 44.7 |
| 209 | 16 | 0.3 | 116.3 | 12.0 | 58.1 | 96.7 | 23.0 | 63.1 |
| 211 | 18 | 0.3 | 74.5 | 12.0 | 60.0 | 39.1 | 37.6 | 56.7 |
| | 18a | 0.3 | 74.9 | 16.0 | 78.0 | 45.5 | 41.5 | 55.7 |
| | 18b | 0.3 | 75.6 | 18.7 | 81.4 | 50.2 | 39.3 | 57.1 |
| | 18c | 0.3 | 76.3 | 20.7 | 91.8 | 57.4 | 41.7 | 61.5 |
| | 18d | 0.3 | 76.5 | 25.4 | 95.2 | 56.5 | 40.8 | 55.8 |

Figure 4:
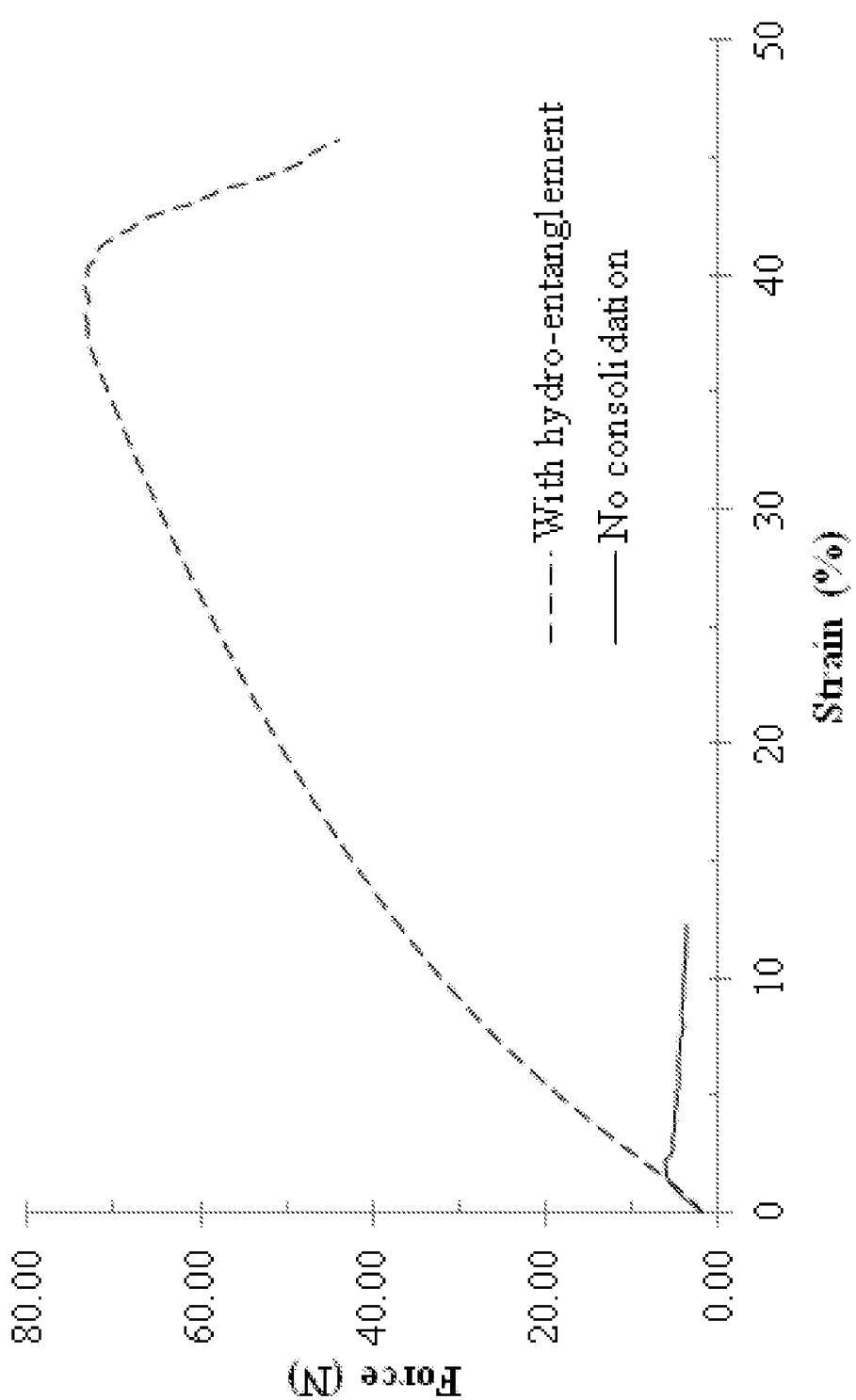
FIG. 4 shows a force-strain analysis of a bicomponent nonwoven fabric (Sample 211) before and after hydro-entanglement, measured in machine direction.

All samples exhibited higher mechanical strength after hydro-entanglement. FIG. 4 below demonstrates this behavior. The fabric in this example (Sample 211) is about ten times stronger after hydro-entanglement. After this sharp increase in mechanical strength, an intensification of the pressure beam does not lead to better mechanicals. The water pressure has then quasi no influence on the tensile strength and elongation in machine direction while in cross direction, a higher pressure lead to lower mechanicals. The beams weaken the fabric in cross direction by creating a crenellated pattern as observed in FIGS. 1 and 8. A denser fabric weight provides better strength in both directions and lowers the elongation. The higher the polypropylene content into the bicomponent fiber, the lowest the mechanical properties, both tensile strength and elongation go down in machine and cross directions.

Filter Efficiency

The hydro-entanglement step turned nonwoven fabrics into filter media. Their separation efficiency was measured according to the ISO 11057:2011 (E) standard as described previously. Only samples which have undergone the highest water pressure were chosen for the test. They are listed below in Table 12. The table captures the ΔP and the gravimetric separation efficiency. Three measurements per sample were realized. Sample 209 could not be tested and is not included.

TABLE 12

Filter efficiency data, gravimetric separation efficiency and ΔP.

| Sample number | Sample project n | PP fraction | Fabric weight, measured (gsm) | ΔP (Pa) | Gravimetric separation efficiency (%) |
|---|---|---|---|---|---|
| 194 | 1a | 0.7 | 119.1 | 33 | 94.3 |
| 196 | 3a | 0.7 | 77.9 | 22 | 85.4 |

TABLE 12-continued

Filter efficiency data, gravimetric separation efficiency and ΔP.

| Sample number | Sample project n | PP fraction | Fabric weight, measured (gsm) | ΔP (Pa) | Gravimetric separation efficiency (%) |
|---|---|---|---|---|---|
| 200 | 7 | 0.3 | 114.7 | 22 | 95.3 |
| 202 | 9d | 0.3 | 76.1 | 17 | 83.0 |
| 203 | 10a | 0.7 | 121.3 | 34 | 90.2 |
| 205 | 12a | 0.7 | 79.5 | 21 | 91.2 |
| 208 | 15a | 0.5 | 78.3 | 22 | 85.4 |
| 211 | 18d | 0.3 | 76.5 | 18 | 83.8 |

Gravimetric separation efficiencies range from 83.0% to 95.3%.

The ΔP (e.g., delta pressure) varies from 17 Pa to 34 Pa. Only two samples have significant higher pressure, 194 and 203. They differ from the PP type and have both high PP:PC ratio and high fabric weight. A higher fabric density obviously leads to a higher ΔP. More surprisingly, the highest the PP:PC ratio in the bicomponent fiber, the higher the pressure drop. In other words, the PC seems to influence the air flow through the filter media. Indeed, Sample 200 with high PC content exhibit a low pressure of 22 Pa with an averaged separation efficiency of 95.3%. The polycarbonate within the bicomponent fiber increases the mechanical properties of the filter media and enables to reach lower pressure at a given fabric weight leading to similar filter efficiency.

Additional mechanical properties are listed for combinations of LUX2010/EXL1112T and PP 510A. They were also measured in MD and CD directions.

TABLE 13

Tensile properties measured on samples in machine and cross directions.

| PP Resin | PC resin | PP Frac | PC/PP viscos. ratio at 100 1/s (260° C.) | Fabric weight (gsm) | Tensile strength MD (N) | Tensile strength CD (N) | Elong at break MD (%) | Elong at break CD (%) | Tensile Strength Anis. Index = MD/CD | (Tensile Strength) Bonding Index = SQRT (MD* CD) |
|---|---|---|---|---|---|---|---|---|---|---|
| 510A | EXL1112T | 0.5 | 2.5 | 109.2 | 65.6 | 46.5 | 40.3 | 62.1 | 1.4 | 55.2 |
| 511A | EXL1112T | 0.5 | 4.6 | 103.4 | 25.5 | 23.5 | 28.5 | 50.0 | 1.1 | 24.4 |

TABLE 13-continued

Tensile properties measured on samples in machine and cross directions.

| PP Resin | PC resin | PP Frac | PC/PP viscos. ratio at 100 1/s (260° C.) | Fabric weight (gsm) | Tensile strength MD (N) | Tensile strength CD (N) | Elong at break MD (%) | Elong at break CD (%) | Tensile Strength Anis. Index = MD/CD | (Tensile Strength) Bonding Index = SQRT (MD* CD) |
|---|---|---|---|---|---|---|---|---|---|---|
| 510A | LUX2010T | 0.5 | 3.3 | 105.2 | 84.0 | 58.3 | 34.6 | 56.6 | 1.4 | 70.0 |
| 511A | LUX2010T | 0.5 | 6.1 | 99.5 | 36.9 | 25.5 | 30.5 | 53.5 | 1.4 | 30.7 |
| 510A | EXL1112T | 0.7 | 2.5 | 101.6 | 35.1 | 24.8 | 34.2 | 53.9 | 1.4 | 29.5 |
| 511A | EXL1112T | 0.7 | 4.6 | 105 | 12.3 | 10.3 | 17.3 | 34.7 | 1.2 | 11.2 |
| 510A | LUX2010T | 0.7 | 3.3 | 104.8 | 66.7 | 45.1 | 34.7 | 53.9 | 1.5 | 54.9 |
| 511A | LUX2010T | 0.7 | 6.1 | 100.1 | 15.7 | 11.5 | 29.1 | 50.0 | 1.4 | 13.4 |

Filter efficiencies were also observed for LUX2010T, EXL1112T and PP 510A combinations. The separation efficiency was also measured according to the ISO 11057: 2011 (E) standard. The efficiencies are presented in Table 14 continuing from Table 13.

TABLE 14

Filter efficiency, gravimetric separation efficiency.

| PP resin | PC resin | PP fraction | PC/PP viscosity ratio at 100 1/s (260° C.) | primary fiber diameter | ΔP (Pa) | Gravimetric separation efficiency (%) | 0.4 micron gravi-metric separation efficiency (%) |
|---|---|---|---|---|---|---|---|
| 510A | EXL1112T | 0.5 | 2.5 | x | 34 | 92.2 | 91.5 |
| 511A | EXL1112T | 0.5 | 4.6 | x | 22 | 89.6 | 90.5 |
| 510A | LUX2010T | 0.5 | 3.3 | x | 48 | 92.8 | 90.3 |
| 511A | LUX2010T | 0.5 | 6.1 | 31.3 | 18 | 86.5 | 86.2 |
| 510A | EXL1112T | 0.7 | 2.5 | 27.4 | | | |
| 511A | EXL1112T | 0.7 | 4.6 | 31.9 | | | |
| 510A | LUX2010T | 0.7 | 3.3 | 31.2 | | | |
| 510A | LUX2010T | 0.7 | 6.1 | 30.8 | | | |
| Commercial PET | | | | 24.0 | | 75.4 | 69.0 |

The higher molecular weight and broad molecular weight distribution of PP 510A appeared to provide better mechanical properties in the filter. It was also apparent that a reduction in viscosity difference between PP and PC at low temperatures (values closer to 1) and an increase in the PP content (50:50 compared to 70:30) resulted in a bicomponent fiber morphology more susceptible to splitting. The results suggested that the segments of the bicomponent fibers are not joined at the center with a solid core.

The gravimetric separation efficiencies and the 0.4 micron gravimetric efficiencies range from 86.5% to 92.8% which would also classify as a "fine dust filter" under the F7-F9 classification according to EN779. As shown, the ΔP varies from 18 Pa to 48 Pa, which may also correspond to the varying PC/PP viscosity ratio given the type of PC resin used (whether the EXL1112T or the LUX2010T). Here however, the lower PC/PP viscosity ratio provided a higher ΔP. In Table 13, when compared to the competitive commercial example polyethylene terephthalate (PET) filter, the inventive LUX2010/EXL1112T and PP 510A combinations exhibited better filtration efficiency (86.5% to 92.8% compared to 75.4%).

Figure 5:
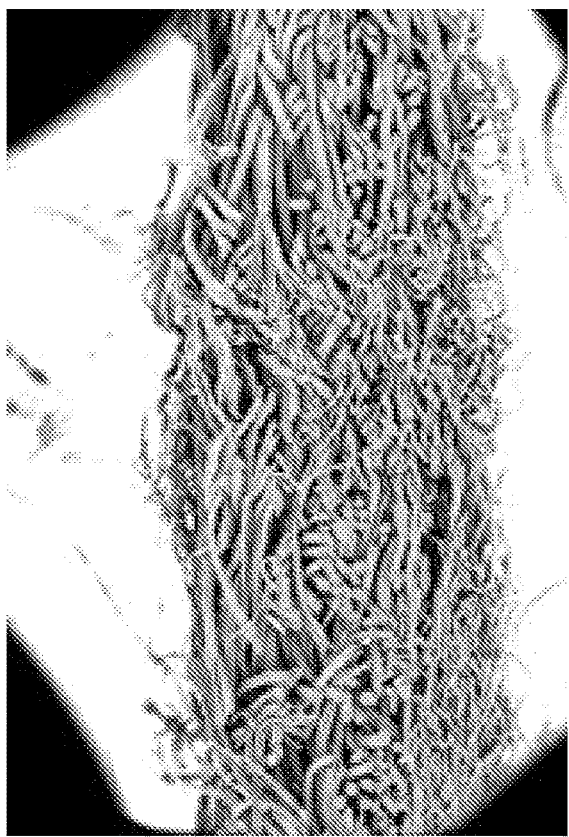
FIG. 5 shows SEM images of the nonwoven fabrics after hydro-entanglement (middle and bottom). The PP:PC ratio within the fiber increases from left to right: (a) 50:50 and (b) 70:30.
Figure 5:
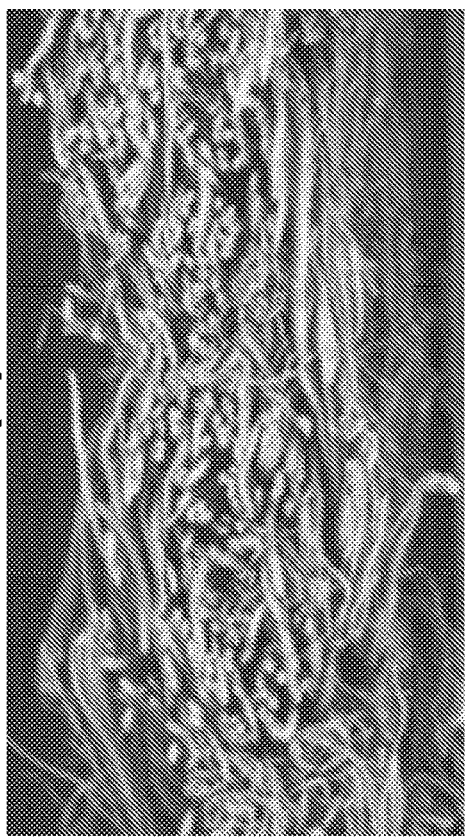
Figure 5:
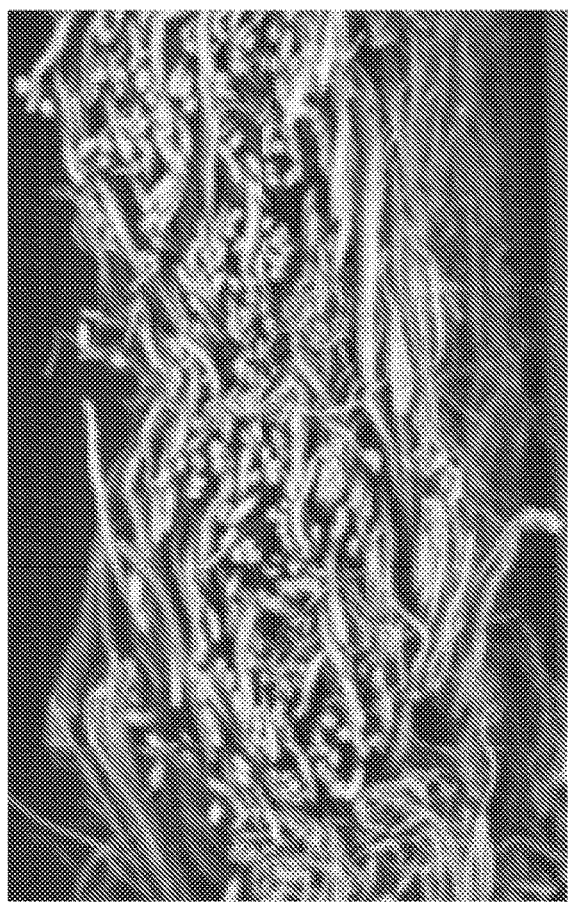
Figure 5:
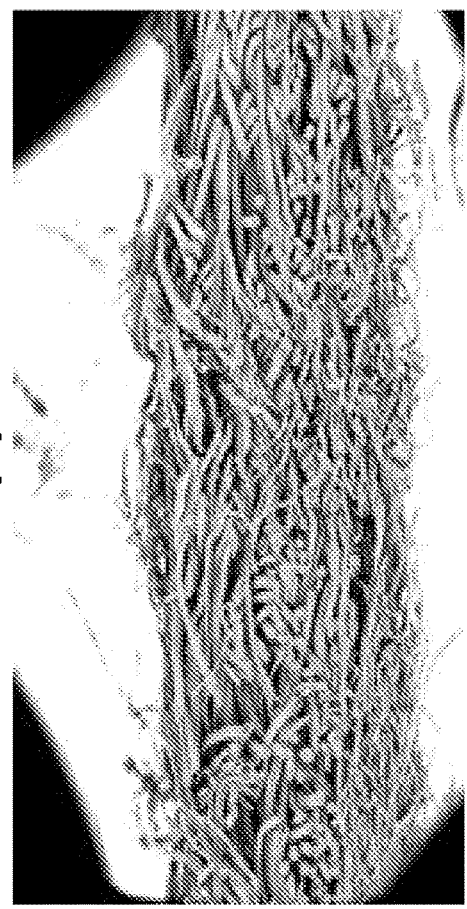

FIG. 5 provides the SEM images of LUX201/510A at 30:70 and 50:50 ratios, respectively, after hydro-entanglement. As shown, successful splitting of the bicomponent fibers was apparent after the hydro-entanglement step.

Static Charging

Figure 6:
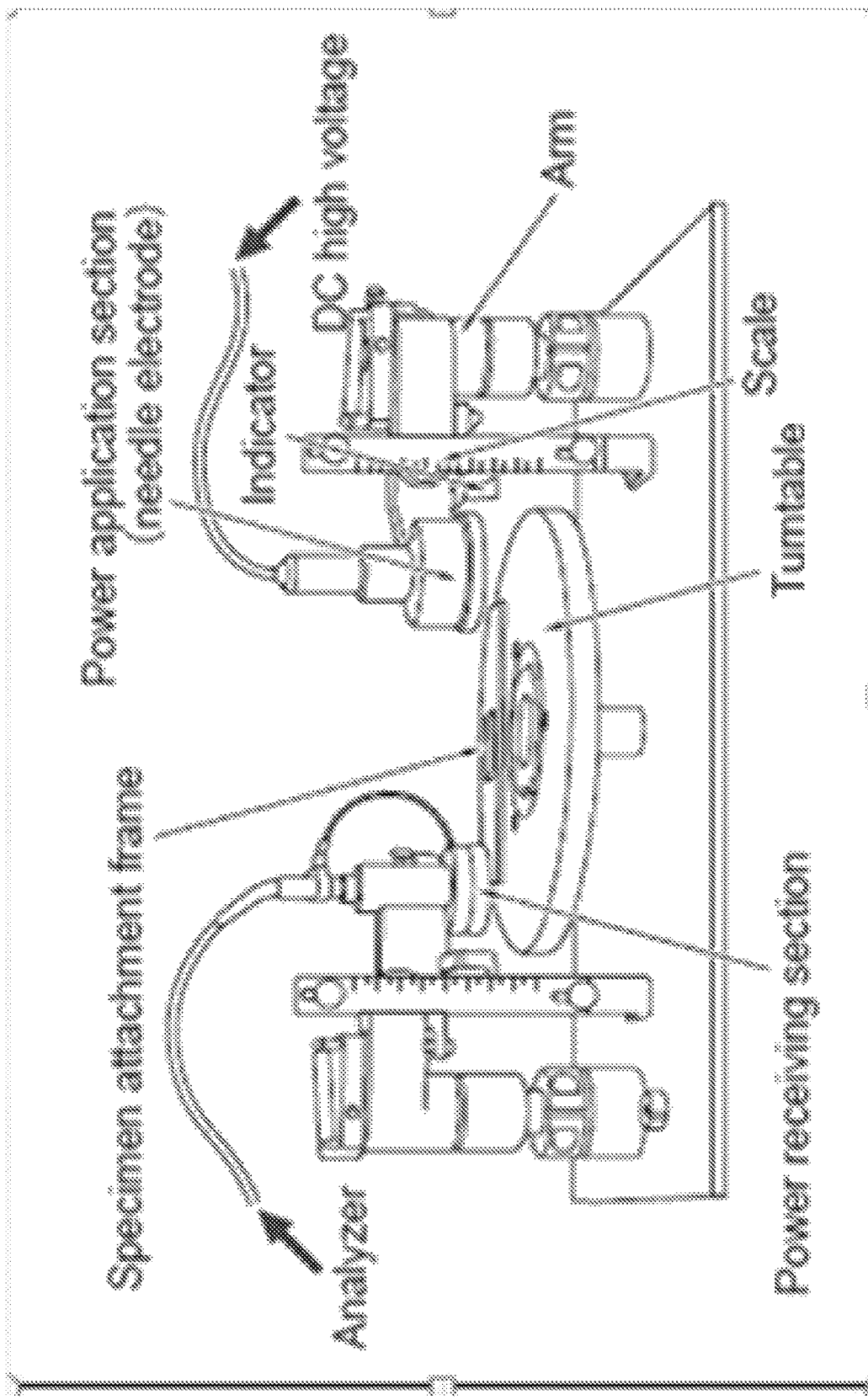
FIG. 6 shows an illustration of Static Honest Meter used to perform static charging analysis of control resins and resin formulations subjected to hydro-entanglement.
Figure 7:
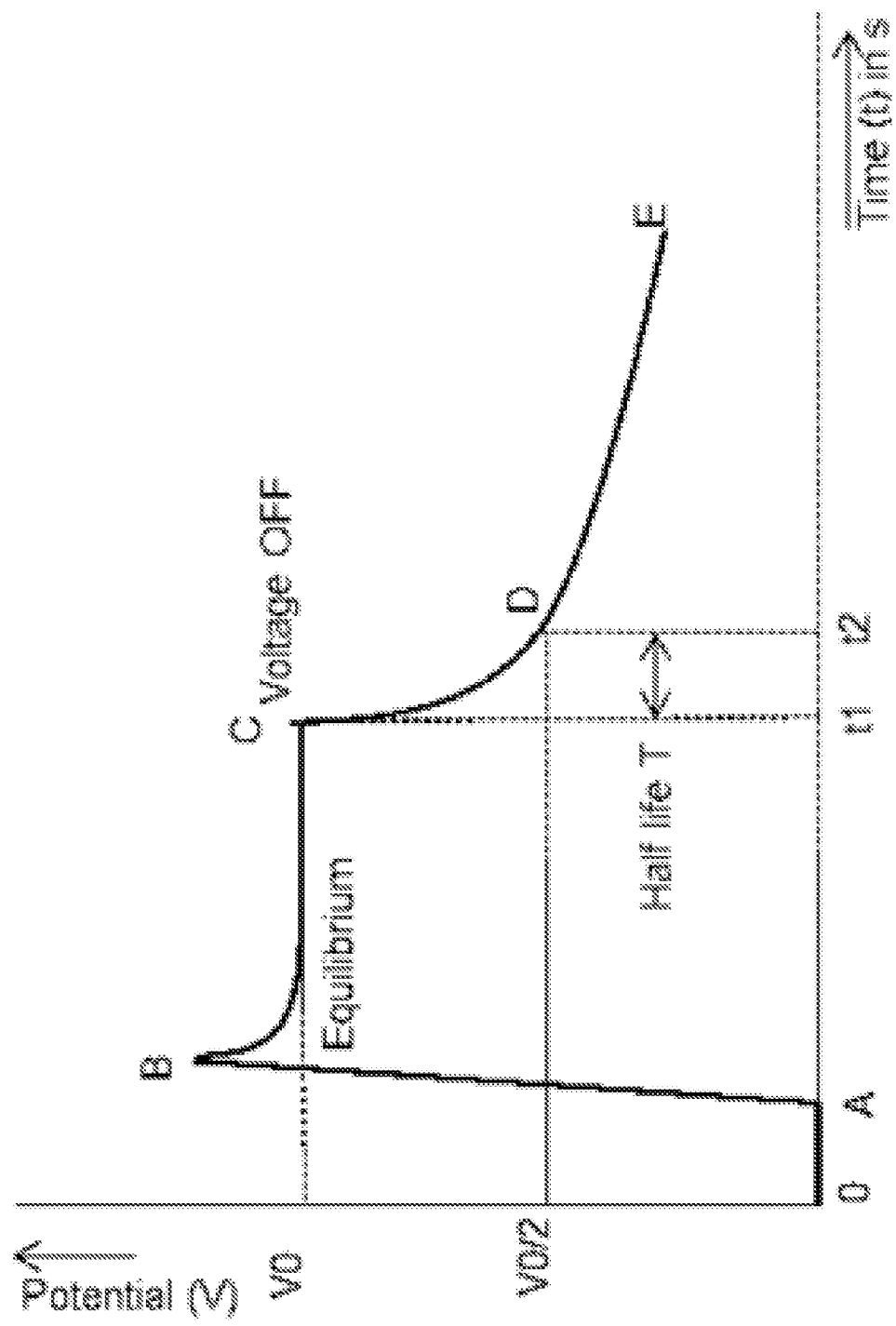
FIG. 7 shows exemplary decay curve of static charge potential over time for resin sample.

Static charging analyses were also performed to determine the effect of the resin formulations and hydroentanglement on the diffusability of static electricity. The resin sample is irradiated by air ions generated by corona discharges initiated by a Static Honest Meter. All measurements were performed under controlled temperature of 23° C. and controlled atmosphere of a relative humidity of 50%. After the irradiation is stopped, the meter measures the decay curve of the static charge on the resin sample. The resin sample was evaluated using the Static Honest Meter of FIG. 6 and assessed based upon the curve as depicted in FIG. 7.

PP:PC resin samples were hydrojetted. It is understood that a commercial PET may undergo hydrojetting. The fabric weight was 100 gsm. As presented in FIG. 6, each sample was placed on the turntable and the turntable was rotated. The resin sample potention begins to increase at point A where high voltage (H.V) is applied (+/−10 kV). Point B of FIG. 7 corresponds to the maximum potential of the sample. Once the sample reaches the equilibrium, the application of the H. V was ended at point C at time t1 where V0 is reached. The potential of the resin samples decreased from point C to point E. The duration of time for the potential to reach the value equal to half the potential V0 at time t2 (point D) corresponds to the half life T. The static charging results for the LEXAN™ OQ1028, LUX2010, EXL1112T, and PP 510A/511A samples are presented in Table 14.

TABLE 15

Surface potential and half life measurements.

| Sample | PP | PC | PP ratio | mV after removing charge | | | mV after equilibrium | | | T ½ half life time in min. | | |
|---|---|---|---|---|---|---|---|---|---|---|---|---|
| | | | | Avg | max | min | Avg | max | min | Avg | max | min |
| V527 | 510A | OQ1028 | 0.7 | 55 | 61 | 50 | 53 | 59 | 47 | 41 | 49 | 27 |
| V528 | 511A | OQ1028 | 0.7 | 54 | 56 | 51 | 52 | 55 | 48 | 63 | 110 | 33 |
| V371 (−10 kV) | 510A | LUX2010T | 0.7 | 56 | 59 | 52 | 52 | 54 | 49 | 19 | 23 | 16 |
| V379 | 511A | LUX2010T | 0.7 | 64 | 67 | 62 | 60 | 64 | 57 | 22 | 32 | 13 |
| V346 | 510A | EXL1112T | 0.7 | 54 | 57 | 49 | 50 | 52 | 45 | 22 | 41 | 10 |
| V355 | 511A | EXL1112T | 0.7 | 62 | 64 | 59 | 59 | 59 | 58 | 42 | 74 | 19 |
| V529 | 511A | OQ1028 | 0.5 | 51 | 52 | 51 | 48 | 48 | 47 | 25 | 31 | 14 |
| V376 | 510A | LUX2010T | 0.5 | 56 | 60 | 51 | 53 | 56 | 50 | 28 | 41 | 20 |
| V385 | 511A | LUX2010T | 0.5 | 59 | 61 | 57 | 51 | 55 | 49 | 11 | 13 | 7 |
| V352 | 510A | EXL1112T | 0.5 | 52 | 53 | 51 | 50 | 51 | 49 | 31 | 39 | 21 |
| V361 | 511A | EXL1112T | 0.5 | 54 | 55 | 54 | 48 | 49 | 47 | 11 | 14 | 9 |
| V530 | 511A | EXL1434T | 0.5 | 46 | 47 | 45 | 44 | 45 | 43 | 26 | 32 | 15 |
| PP510A | — | — | — | 37 | 39 | 34 | 25 | 27 | 22 | 4 | 5 | 3 |
| PET com | — | — | — | 49 | 50 | 48 | 10 | 13 | 9 | 1 | 1 | 1 |

As provided in Table 15, PET showed a higher charging capability than the PP 510A resin sample. Generally however the PP:PC samples exhibited a higher charging capability (see mV after removing charge −10 kV). For charge retention, the PP:PC samples again exhibited a higher surface potential than the PP 510A and PET samples. Here, the PP:PC surface potential values were significantly greater than PET surface potential values (see mV after equilibrium). Further, based upon the observed half-life values, the PP:PC bicomponent fiber exhibited the slowest dissipation of the charge with the 0.3 OQ1028 fiber showing the longest average half-life (63.33). PET and PP 510A exhibited significantly shorter average half-life times at 0.9 and 4, respectively. Overall, results indicated that hydrojetting improved the performance in retaining the surface potential.

Aspects

The present disclosure comprises at least the following aspects.

Aspect 1. A spunbond nonwoven fabric comprising a plurality of bicomponent filaments, the bicomponent filaments having a segmented pie cross-sectional configuration including a polycarbonate component and a polypropylene component, wherein a ratio of the polypropylene component to the polycarbonate component is between about 5:95 and about 95:5.

Aspect 2. The spunbond nonwoven fabric of Aspect 1, wherein a ratio of the polypropylene component to the polycarbonate component is between about 30:70 and about 70:30.

Aspect 3. The spunbond nonwoven fabric of Aspect 1 or 2, wherein the bicomponent filaments have a hollow segmented pie cross-sectional configuration.

Aspect 4. The spunbond nonwoven fabric of any one of Aspects 1-3, wherein ratio of the polypropylene component to the polycarbonate component is between about 30:70 and about 70:30.

Aspect 5. The spunbond nonwoven fabric of anyone of Aspects 1-4, wherein the polycarbonate homopolymer or copolymer has a weight average molecular weight from about 15,000 to about 50,000 grams/mole, as measured by gel permeation chromatography using BPA polycarbonate standards Aspect 6. The spunbond nonwoven fabric of anyone of Aspects 1-5, wherein the polypropylene is a homopolymer or a copolymer.

Aspect 7. A filter media comprising a layer including the spunbond nonwoven fabric of any of Aspects 1-6.

Aspect 8. The filter media of Aspect 7, wherein the filter media comprises a single layer.

Aspect 9. The filter media of Aspect 7 or 8, where the filter media achieves a filter media classification greater than F7 according to EN779:2012.

Aspect 10. The filter media of any one of Aspects 7-9, where the filter media achieves a gravimetric separation efficiency of between about 83% and about 99.999% according to ISO 11057:2011 (E).

Aspect 11. The filter media of any one of Aspects 7-10, where the filter media achieves a ΔP of less than 60 Pascals (Pa).

Aspect 12. The filter media of any one of Aspects 7-11, where the filter media achieves ΔP of less than 35 Pa.

Aspect 13. The filter media of any one of Aspects 7-12, wherein the filter media is configured to hold an electrostatic charge.

Aspect 14. The filter media of any one of Aspects 7-13, wherein the filter media is an air filter.

Aspect 15. A method of making a spunbond nonwoven fabric comprising: separately melting a polycarbonate component and a polypropylene component; directing the polycarbonate component and the polypropylene component through spinneret orifices configured to form a plurality of bicomponent filaments; and causing at least a portion of the bicomponent filaments to break apart and entangle with each other.

Aspect 16. The method of Aspect 15, wherein a ratio of the polypropylene component to the polycarbonate component is between about 5:95 and about 95:5.

Aspect 17. The method of any of Aspect 15 or 16, wherein a ratio of the polypropylene component to the polycarbonate component is between about 30:70 and about 70:30.

Aspect 18. The method of anyone of Aspects 15-17, further comprising forming a filter media including the portion of the entangled bicomponent filaments.

Aspect 19. The method of Aspect 18, where the filter media achieves a filter media classification greater than F7 according to EN779:2012.

Aspect 20. The method of Aspect 18 or 19, where the filter media achieves a gravimetric separation efficiency of between about 83% and about 99.999% according to ISO 11057:2011 (E).

Aspect 21. The method of anyone of Aspects 18-20, where the filter media is configured to hold an electrostatic charge.

Aspect 22. The method of anyone of Aspects 15-21, wherein causing at least a portion of the bicomponent filaments to break apart is achieved via one or more of fibrillation, needle punching, and fluid jet.

Aspect 23. The method of anyone of Aspects 15-22, wherein the bicomponent filaments have a fiber size from about 0.5 µm to about 50 µm.

Aspect 24. An article comprising: a housing; and at least one filter media disposed adjacent the housing, the filter media comprising a spunbond nonwoven fabric comprising a plurality of bicomponent filaments, the bicomponent filaments having a segmented pie or a segmented hollow pie cross-sectional configuration including a polycarbonate component and a polypropylene component, wherein a ratio of the polypropylene component to the polycarbonate component is between about 5:95 and about 95:5.

Aspect 25. The article of Aspect 24, wherein the filter media comprises a single layer.

Aspect 26. The article of Aspect 24 or 25, where the filter media achieves a filter media classification greater than F7 according to EN779:2012.

Aspect 27. The article of anyone of Aspects 24-26, where the filter media achieves a gravimetric separation efficiency of between about 83% and about 99.999% according to ISO 11057:2011 (E).

Aspect 28. The article of anyone of Aspects 24-27, where the filter media achieves a ΔP of less than 60 Pa.

Aspect 29. The article of anyone of Aspects 24-27, where the filter media achieves ΔP of less than 35 Pa.

Aspect 30. The article of anyone of Aspects 24-29, wherein the filter media is configured to hold an electrostatic charge.

Aspect 31. The article of anyone of Aspects 24-30, wherein the housing is configured to be received in a fluid channel and is operable as an air filter.

Aspect 32. A spunbond nonwoven fabric comprising a plurality of bicomponent filaments, the bicomponent filaments having a segmented pie cross-sectional configuration including a first dielectric component and a second dielectric component, wherein the first dielectric component and the second dielectric component are immiscible, and wherein a ratio of the second dielectric component to the first dielectric component is between about 5:95 and about 95:5.

Aspect 33. A spunbond nonwoven fabric comprising a plurality of bicomponent filaments, the bicomponent filaments having a segmented pie cross-sectional configuration including a polycarbonate component and a polypropylene component, wherein a ratio of the polypropylene component to the polycarbonate component is between about 5:95 and about 95:5.

Aspect 34. The spunbond nonwoven fabric of aspect 33, wherein a ratio of the polypropylene component to the polycarbonate component is between about 30:70 and about 70:30.

Aspect 35. The spunbond nonwoven fabric of any of aspects 32-34, wherein the bicomponent filaments have a hollow segmented pie cross-sectional configuration and wherein the bicomponent filaments have an average diameter from about 0.5 µm to about 50 µm.

Aspect 36. The spunbond nonwoven fabric of any one of aspects 32-35, wherein the bicomponent filaments exclude polyethylene terephthalate.

Aspect 37. The spunbond nonwoven fabric of anyone of aspects 33-36, wherein the polycarbonate component is a homopolymer or a copolymer and has a weight average molecular weight from about 15,000 to about 50,000 grams/mole, as measured by gel permeation chromatography using BPA polycarbonate standards Aspect 38. The spunbond nonwoven fabric of anyone of aspects 33-37, wherein the polypropylene is a homopolymer or a copolymer.

Aspect 39. The spunbond nonwoven fabric of anyone of aspects 32-38, wherein the spunbond nonwoven fabric exhibits a charge retention that is greater than a charge retention of a substantially similar spunbond nonwoven fabric consisting of only a polypropylene component, only a polyethylene terephthalate, or a plurality of bicomponent filaments formed from polyethylene terephthalate and a polypropylene component.

Aspect 40. A filter media comprising a layer including the spunbond nonwoven fabric of any of aspects 32-39.

Aspect 41. The filter media of aspect 40, wherein the filter media consists of a single layer.

Aspect 42. The filter media of aspects 40 or 41, where the filter media achieves a filter media classification of greater than F7 according to EN779:2012.

Aspect 43. The filter media of any of aspects 40-42, where the filter media achieves a gravimetric separation efficiency of between about 83% and about 99.999% according to ISO 11057:2011 (E).

Aspect 44. The filter media of any of claims aspects 40-43, wherein the filter media is configured to hold an electrostatic charge.

Aspect 45. A method of making a spunbonded nonwoven fabric comprising: separately melting a polycarbonate component and a polypropylene component; directing the polycarbonate component and the polypropylene component through spinneret orifices configured to form a plurality of bicomponent filaments; and causing at least a portion of the bicomponent filaments to break apart and entangle with each other.

Aspect 46. The method of aspect 45, further comprising forming a filter media including the portion of the entangled bicomponent filaments, wherein the filter media achieves a filter media classification of greater than F7 according to EN779:2012.

Aspect 47. The method of aspect 46, where the filter media achieves a gravimetric separation efficiency of between about 83% and about 99.999% according to ISO 11057:2011 (E).

Aspect 48. The method of any of aspects 45-47, wherein causing at least a portion of the bicomponent filaments to break apart is achieved via one or more of fibrillation, needle punching, and fluid jet.

Aspect 49. An article comprising: a housing; at least one filter media disposed adjacent the housing, the filter media comprising a spunbond nonwoven fabric comprising a plurality of bicomponent filaments, the bicomponent filaments having a segmented pie cross-sectional configuration including a polycarbonate component and a polypropylene component, wherein a ratio of the polypropylene component to the polycarbonate component is between about 5:95 and about 95:5.

Aspect 50. The article of aspect 49, where the filter media achieves a filter media classification of greater than F7 according to EN779:2012.

Aspect 51. The article of any of aspects 49-50 where the filter media achieves a gravimetric separation efficiency of between about 83% and about 99.999% according to ISO 11057:2011 (E).

What is claimed is:

1. A spunbond nonwoven fabric comprising a plurality of bicomponent filaments, the bicomponent filaments having a segmented pie cross-sectional configuration including a first dielectric component and a second dielectric component, wherein the first dielectric component and the second dielectric component are immiscible, wherein a ratio of the second dielectric component to the first dielectric component is between about 5:95 and about 95:5, and wherein the first dielectric component comprises a polycarbonate component and the second dielectric component comprises a polypropylene component.

2. The spunbond nonwoven fabric of claim 1, wherein a ratio of the polypropylene component to the polycarbonate component is between about 30:70 and about 70:30.

3. The spunbond nonwoven fabric of claim 1, wherein the bicomponent filaments have a hollow segmented pie cross-sectional configuration and wherein the bicomponent filaments have an average diameter from about 0.5 μm to about 50 μm.

4. The spunbond nonwoven fabric of claim 1, wherein the bicomponent filaments exclude polyethylene terephthalate.

5. The spunbond nonwoven fabric of claim 1, wherein the polycarbonate component is a homopolymer or a copolymer and has a weight average molecular weight from about 15,000 to about 50,000 grams/mole, as measured by gel permeation chromatography using BPA polycarbonate standards.

6. The spunbond nonwoven fabric of claim 1, wherein the polypropylene is a homopolymer or a copolymer.

7. The spunbond nonwoven fabric of claim 1, wherein the spunbond nonwoven fabric exhibits a charge retention that is greater than a charge retention of a substantially similar spunbond nonwoven fabric consisting of only a polypropylene component, only a polyethylene terephthalate or a plurality of bicomponent filaments formed from polyethylene terephthalate and a polypropylene component.

8. A filter media comprising a layer including the spunbond nonwoven fabric of claim 1.

9. The filter media of claim 8, wherein the filter media consists of a single layer.

10. The filter media of claim 8, where the filter media achieves a filter media classification of greater than F7 according to EN779:2012.

11. The filter media of claim 8, where the filter media achieves a gravimetric separation efficiency of between about 83% and about 99.999% according to ISO 11057:2011 (E).

12. The filter media of claim 8, wherein the filter media is configured to hold an electrostatic charge.

13. A method of making a spunbond nonwoven fabric comprising:
separately melting a polycarbonate component and a polypropylene component;
directing the polycarbonate component and the polypropylene component through spinneret orifices configured to form a plurality of bicomponent filaments; and
causing at least a portion of the bicomponent filaments to break apart and entangle with each other;
wherein the bicomponent filaments having a segmented pie cross-sectional configuration including the polycarbonate component and the polypropylene component, wherein the polycarbonate component and the polypropylene component are immiscible, and wherein a ratio of the polypropylene component to the polycarbonate component is between about 5:95 and about 95:5.

14. The method of claim 13, further comprising forming a filter media including the portion of the entangled bicomponent filaments, wherein the filter media achieves a filter media classification of greater than F7 according to EN779:2012.

15. The method of claim 14, where the filter media achieves a gravimetric separation efficiency of between about 83% and about 99.999% according to ISO 11057:2011 (E).

16. The method of any of claim 13, wherein causing at least a portion of the bicomponent filaments to break apart is achieved via one or more of fibrillation, needle punching, and fluid jet.

17. An article comprising:
a housing;
at least one filter media disposed adjacent the housing, the filter media comprising a spunbond nonwoven fabric comprising a plurality of bicomponent filaments, the bicomponent filaments having a segmented pie cross-sectional configuration including a polycarbonate component and a polypropylene component, wherein the polypropylene component and the polycarbonate component are immiscible, wherein a ratio of the polypropylene component to the polycarbonate component is between about 5:95 and about 95:5.

18. The article of claim 17, where the filter media achieves a filter media classification of greater than F7 according to EN779:2012.

19. The article of any of claim 17, where the filter media achieves a gravimetric separation efficiency of between about 83% and about 99.999% according to ISO 11057:2011 (E).

* * * * *